June 21, 1927.
F. A. PRAHL
SHEET METAL CONTAINER
Filed Sept. 15, 1926
1,632,848
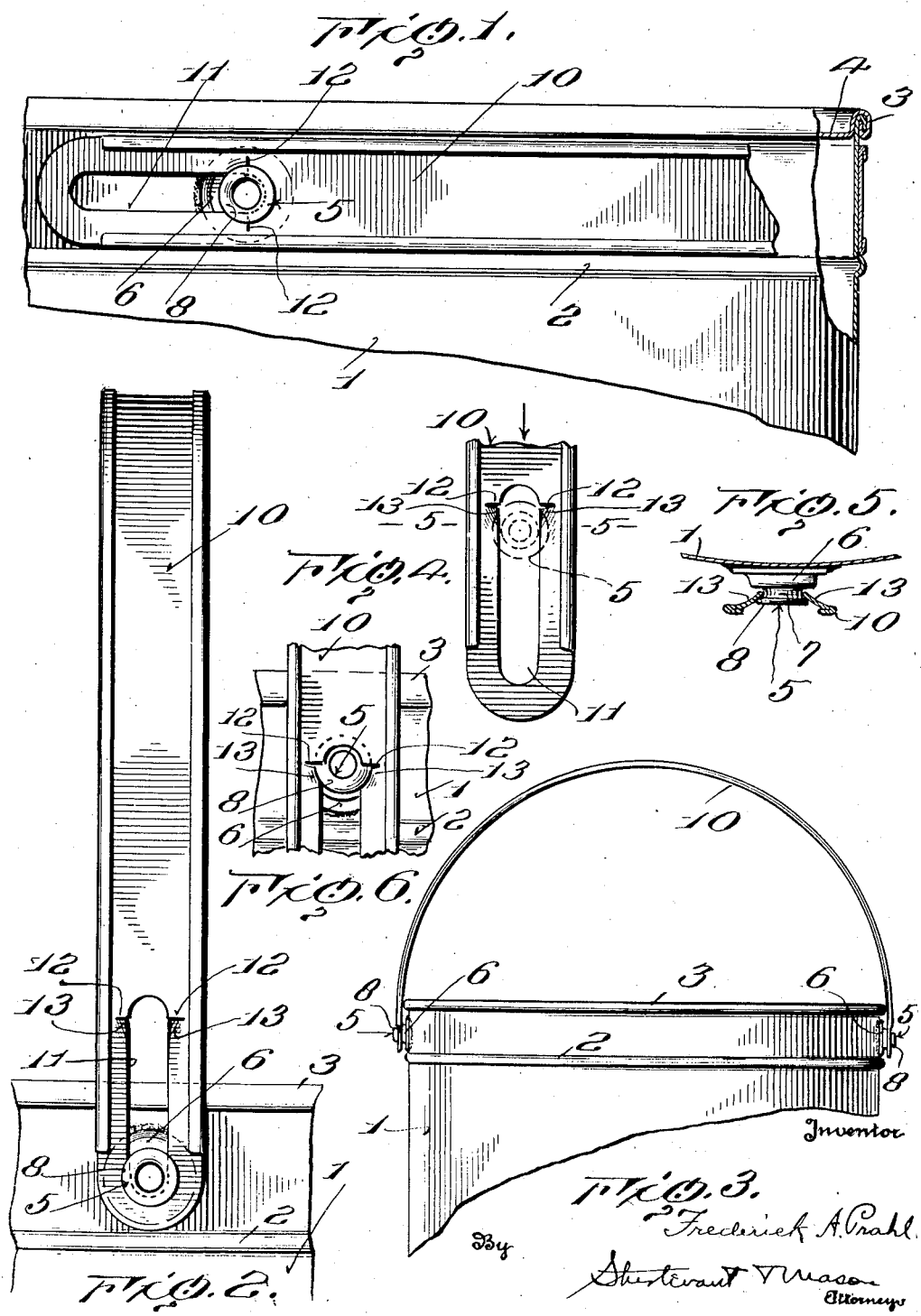

Patented June 21, 1927.

1,632,848

UNITED STATES PATENT OFFICE.

FREDERICK A. PRAHL, OF CHICAGO, ILLINOIS, ASSIGNOR TO CONTINENTAL CAN COMPANY, INC., OF NEW YORK, N. Y., A CORPORATION OF NEW YORK.

SHEET-METAL CONTAINER.

Application filed September 15, 1926. Serial No. 135,598.

The invention relates to new and useful improvements in sheet metal containers, and more particularly to a container of the type shown on the application of Charles Hurley, filed January 8, 1926, Serial No. 82,299.

An object of the invention is to provide a sheet metal container of the above type having a flat bail with means whereby said bail may be readily attached to or detached from the body portion of the container.

A further object of the invention is to provide a container of the above type having a flat bail which is so constructed that the bail when turned down into a plane parallel with the top of the container may be moved to a nested position concentric with the container.

In the drawings which show by way of illustration one embodiment of the invention—

Figure 1 is a view partly in side elevation and partly in section of a portion of a container having my improvements applied thereto, the bail being folded down and moved to a nested position relative to the container;

Fig. 2 is a view of a portion of the container and the bail with the bail in raised position;

Fig. 3 is a side view of the container showing the bail raised, and the bail in edge view;

Fig. 4 is a detail showing the metal in the bail at the sides of the slot as bent to release the bail from the pivot stud, and with the pivot stud shown in dotted lines adjacent its releasing point.

Fig. 5 is a sectional view through the bail, pivot stud and container body on the line 5—5 of Fig. 4.

Fig. 6 is an enlarged detail showing the headed stud as partly released from the bail.

The invention relates to the means for connecting a flat bail to a container so that the flat bail may be moved to a nested position relative to the body when turned down to horizontal position, so as to permit the container with the bail attached to be rolled for applying a label thereto, and is directed particularly to the manner of connecting the bail to the container so that it may be readily attached thereto, and when the container is completed it can be readily detached whenever desired. To this end the flat bail is provided with a slot at each end thereof, and the bail at the inner ends of these slots is cut through so that the side walls of the slots adjacent said cuts may be moved out of the plane of the body portion of the bail. This is done by bending the metal. The bail is secured to the container by a headed pivot stud one of course for each end of the bail. This headed pivot stud has a neck portion which is smaller than the head, and the neck portion is slightly narrower in diameter than the width of the slot in the bail. As a result, the bail end can slide along the pivot stud on said neck portion. This enables the bail to be turned down to horizontal position, that is, into a plane parallel with the top of the container, and then to be moved endwise to a nested position. It enables the bail also to be moved so as to bring the pivot stud adjacent the end of the slot where it is cut, and the head of the pivot stud passing through said slits and off the end of the side walls of the slot is detached from the container body.

Referring more in detail to the drawings, the improved container consists of a body portion 1 which is provided with a hollow bead 2 which is slightly spaced from the upper end. The body of the container is formed with the bead 3 at the extreme upper edge which may be in the form of a double seam for joining the closed end to the container body. The closing end is indicated as 4 in the drawing, and when such end is used there is a relatively small hole in the center of the end which is closed by a cap.

Secured at diametrically opposite points to the container body are supporting pivot studs 5. These pivot studs are similar in construction and each consists of a supporting member 6, a neck portion 7 and an outer head 8. The head 8 is of slightly larger diameter than the neck portion and both the head and neck are of less diameter than the support 6. The essential feature in the construction of the pivot stud is the neck portion 7. The invention is directed particularly to the flat bail which is indicated at 10. This flat bail is preferably provided with two folded beads along the opposite edges thereof. Said bail is provided with a slot 11 which is parallel to the longitudinal center of the bail and extends for a distance back from the end of the bail. The metal of the flat bail 10 is cut to form slits 12, 12, one at each side of the slot and adjacent the end of the slot. When the metal is cut as just described the side portions 13, 13, of the bail along the edges of the slot 11 can be bent out of the plane of the bail as indicated in Figs. 4 and 5 and will remain in this position for the attachment of the bail to the pivot studs. This is the normal position of the parts of the bail for the attachment of the same to the studs. When so bent then the head of the pivot stud may be passed from the inside of the bail onto said bent portions 13, 13 and slide along said bent portions until the neck of the pivot stud is in the slot. The head of the pivot stud overlaps the side walls of the slot. After the bail has been attached to the container body after the manner described, then the side portions 13, 13 may be readily bent back into the plane of the body portion of the bail, and this will prevent the bail from becoming detached from the pivot stud. It is only when the metal parts are so bent or sprung by pressure that the head 8 can pass through the slits 12, 12. As clearly shown in the drawings, the neck 7 of the pivot studs may be comparatively short, and in fact, only slightly longer than the thickness of the metal, for the reason that the bail is brought into engagement with the stud by the sliding of the stud along the deflected portions of the bail until the head has passed through the slit and the neck portion entered the slot. It is the lateral movement of the head along the slot which brings the bail ends into engagement with the pivot studs.

When it is desired to remove the bail then of course the metal is bent or sprung as stated, and when the bail is moved in an endwise direction relative to the pivot stud, it can pass through the slits 12, 12 and beneath or to the inner side of the bail and thus the bail is removed. It is understood of course that each end of the bail is provided with a slot and the metal is cut so as to provide these slits 12, 12, and thereafter the bail may have both ends attached to the container body or disconnected therefrom.

When the bail is turned to a position substantially parallel with the top edge of the container body as shown in Fig. 1, it can be moved endwise and nested between the hollow bead 2 and the bead 3 at the upper end of the body. This is of great advantage in the shipping of the filled containers and in the applying of labels thereto, as the container body can be rolled along without the bail interfering therewith.

It is obvious that minor changes in the details of construction can be made without departing from the spirit of the invention as set forth in the appended claim.

I claim:

A sheet metal container including a body portion having flat headed pivot studs secured thereto at diametrically opposite points, a flat sheet metal bail having elongated slots at each end thereof, each of said studs having a neck portion of slightly less diameter than the width of the slot and having its head portion of greater diameter than the width of the slot, the metal portion of said bail adjacent the inner end of the elongated slot being cut at angles to the edge of the slot at both sides thereof, the portions of the bail along the slot terminating at the angular cuts therein, being normally deflected out of the plane of the body portion of the bail to permit the respective heads of the pivot studs to pass along the deflected portions of the bail and the neck portion of the stud to pass into its respective slot.

In testimony whereof, I affix my signature.

FREDERICK A. PRAHL.